(12) United States Patent
Novacek

(10) Patent No.: US 11,487,913 B2
(45) Date of Patent: Nov. 1, 2022

(54) METHOD AND DEVICE FOR COMMISSIONING A PASSENGER-TRANSPORTATION INSTALLATION TO BE MANUFACTURED, BY CREATION OF A DIGITAL REPLICA

(71) Applicant: INVENTIO AG, Hergiswil (CH)

(72) Inventor: Thomas Novacek, Schwechat (AT)

(73) Assignee: Inventio AG, Hergiswil (CH)

( * ) Notice: Subject to any disclaimer, the term of this patent is extended or adjusted under 35 U.S.C. 154(b) by 389 days.

(21) Appl. No.: 16/771,968

(22) PCT Filed: Dec. 7, 2018

(86) PCT No.: PCT/EP2018/083946
§ 371 (c)(1),
(2) Date: Jun. 11, 2020

(87) PCT Pub. No.: WO2019/115380
PCT Pub. Date: Jun. 20, 2019

(65) Prior Publication Data
US 2021/0216676 A1    Jul. 15, 2021

(30) Foreign Application Priority Data
Dec. 14, 2017 (EP) .................................... 17207399

(51) Int. Cl.
*G06F 30/20* (2020.01)
*G06F 17/10* (2006.01)
*G06F 30/13* (2020.01)
*G06F 30/17* (2020.01)
*G06Q 50/04* (2012.01)
*G06F 111/16* (2020.01)

(52) U.S. Cl.
CPC .............. *G06F 30/13* (2020.01); *G06F 30/17* (2020.01); *G06F 30/20* (2020.01); *G06Q 50/04* (2013.01); *G06F 2111/16* (2020.01)

(58) Field of Classification Search
CPC .......... G06F 30/13; G06F 30/17; G06F 30/20; G06Q 50/04
USPC ............................................................. 703/1
See application file for complete search history.

(56) References Cited

U.S. PATENT DOCUMENTS 7,249,250 B1    7/2007  Akasaka et al.
7,574,271 B2 *  8/2009  Steindl .................... B66B 25/00
                                              700/21
(Continued)

FOREIGN PATENT DOCUMENTS

CN    1713196 A    12/2005
CN  101389558 A     3/2009
(Continued)

OTHER PUBLICATIONS

International Search Report for International Application No. PCT/EP2018/083946 dated Mar. 4, 2019.

*Primary Examiner* — Andre Pierre Louis
(74) *Attorney, Agent, or Firm* — Knobbe Martens Olson & Bear LLP

(57) ABSTRACT

A method and a device for commissioning a passenger transport system to be manufactured, such as an escalator, is disclosed. The method comprises the creation of a commissioning digital double dataset of the passenger transport system with target data that depicts characterizing properties of components of the passenger transport system in a target configuration.

11 Claims, 5 Drawing Sheets

(56) References Cited

U.S. PATENT DOCUMENTS

| | | |
|---|---|---|
| 7,594,564 B2 | 9/2009 | Siikonen et al. |
| 9,683,454 B1 | 6/2017 | Welch et al. |
| 2007/0250199 A1 | 10/2007 | Akasaka et al. |
| 2016/0247129 A1 | 8/2016 | Song et al. |
| 2016/0333854 A1 | 11/2016 | Lund et al. |
| 2017/0091791 A1 | 3/2017 | Srinivasan et al. |
| 2017/0286572 A1 | 10/2017 | Hershey et al. |
| 2018/0056761 A1* | 3/2018 | Guzman ................ B61D 19/02 |
| 2018/0227277 A1 | 8/2018 | Fischer et al. |
| 2019/0126377 A1* | 5/2019 | Gartner .............. B23K 37/0229 |

FOREIGN PATENT DOCUMENTS

| | | |
|---|---|---|
| CN | 102687177 A | 9/2012 |
| DE | 102015217855 A1 | 3/2017 |
| JP | 2001142935 A | 5/2001 |
| JP | 2005284830 | 10/2005 |
| JP | 2007210755 A | 8/2007 |
| WO | WO 2001/16812 A1 | 3/2001 |
| WO | WO 201745789 A1 | 3/2017 |
| WO | WO 2017/085238 | 5/2017 |
| WO | WO 2017137256 A1 | 8/2017 |

\* cited by examiner

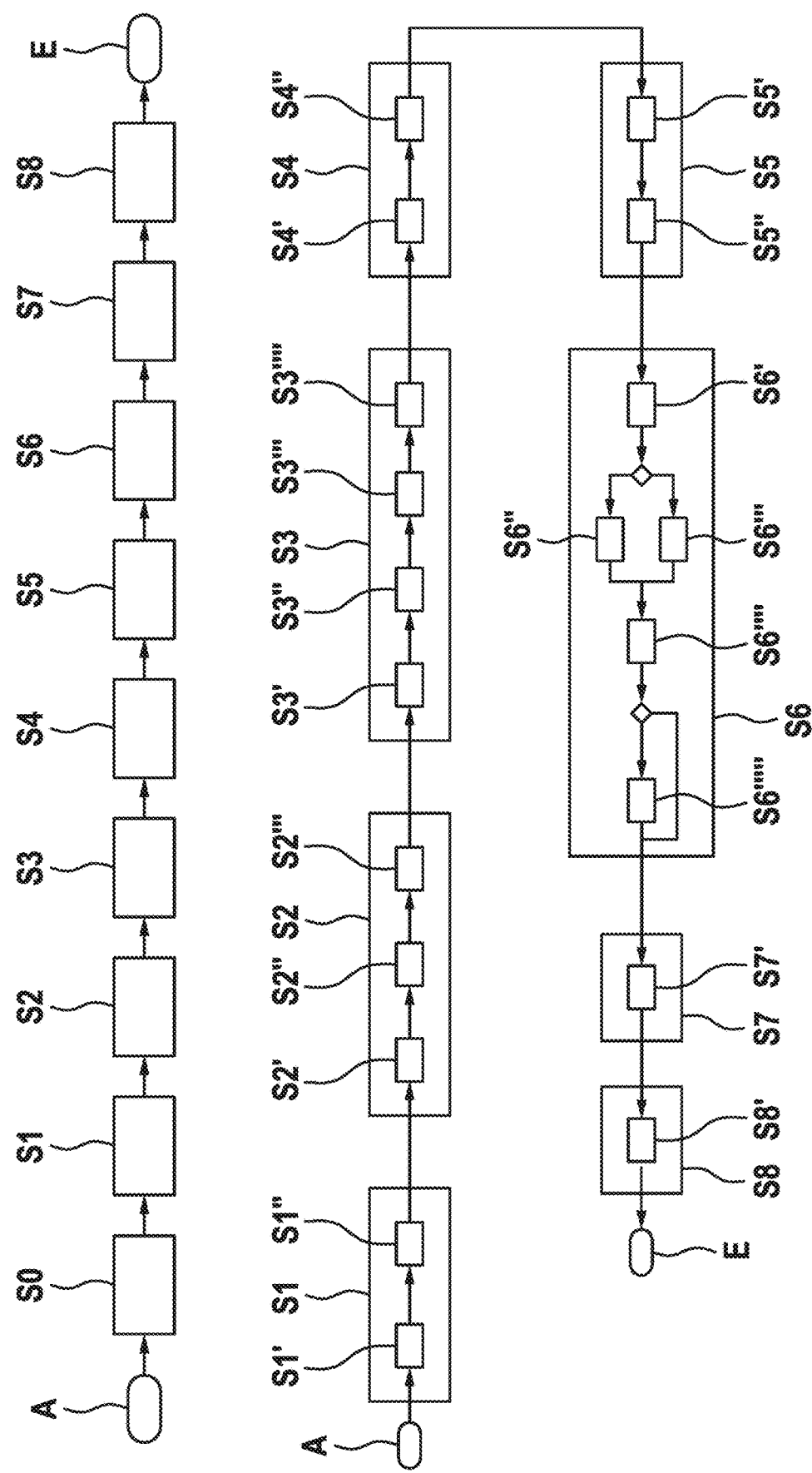

METHOD AND DEVICE FOR COMMISSIONING A PASSENGER-TRANSPORTATION INSTALLATION TO BE MANUFACTURED, BY CREATION OF A DIGITAL REPLICA

INCORPORATION BY REFERENCE OF ANY PRIORITY APPLICATION(S)

Any and all applications for which a foreign or domestic priority claim is identified in the Application Data Sheet as filed with the present application are hereby incorporated by reference under 37 CFR 1.57.

TECHNICAL FIELD

The present disclosure relates to a method and a device for commissioning a passenger transport system to be manufactured, such as an elevator, an escalator or a moving walkway. The disclosure further relates to a method for manufacturing a passenger transport system, a computer program product designed to carry out or control one of the proposed methods, and a computer-readable medium storing this computer program product.

SUMMARY

Passenger transport systems in the form of elevators, escalators or moving walkways are used to convey passengers within buildings. If a building is to be equipped with a passenger transport system, the passenger transport system must first be suitably planned, then manufactured as a whole or in parts and finally installed in the building. A planning process includes the essential process of commissioning the passenger transport system taking into consideration order-specific customer specifications, which may include conditions at the planned installation location, but also a customer's wishes, for example, with regard to conveying capacity, functionality and/or the appearance of the future passenger transport system.

Commissioning includes, in particular, assembling components from which the entire passenger transport system can be assembled and installed in the building, as well as suitably dimensioning the components or adapting the properties of the components so that each component can perform a function assigned to it within the passenger transport system.

The commissioning or planning of the passenger transport system and the subsequent manufacture of the passenger transport system are traditionally very complex processes which could not be carried out, or at least only to a certain extent, automatically.

There may therefore be a need for a method and a device for commissioning a passenger transport system as well as a method for manufacturing a passenger transport system with which the commissioning or manufacturing process can be simplified and/or expanded in a partially automated or even fully automated manner. Furthermore, there may be a need for a computer program product for carrying out the method on a programmable device and a computer-readable medium with such a computer program product stored thereon.

Such a need can be met with the subject matter according to one of the independent claims. Advantageous embodiments are defined in the dependent claims and in the following description.

According to a first aspect of the disclosure, a method for commissioning a passenger transport system to be manufactured is proposed, which comprises creating a so-called commissioning digital double dataset of the passenger transport system. The commissioning digital double dataset includes target data, which represent the characterizing properties of components of the passenger transport system in a target configuration. The creation of the commissioning digital double dataset comprises, firstly, the creation of commissioning data taking into consideration previously collected, customer-specific configuration data from generic component model datasets and defined component model datasets. This is followed by the creation of manufacturing data that specify the target configuration by supplementing the commissioning data with production-specific data.

According to a second aspect of the disclosure, a method for manufacturing a passenger transport system is proposed, which comprises commissioning the passenger transport system by means of a method according to an embodiment of the first aspect of the disclosure and manufacturing the passenger transport system with characterizing properties, as described in the commissioning digital double dataset.

According to a third aspect of the disclosure, a device for commissioning a passenger transport system is proposed, the device being configured to create a commissioning digital double dataset of the passenger transport system with target data which depicts characterizing properties of components of the passenger transport system in a target configuration, by first creating commissioning data taking into consideration previously collected customer-specific configuration data from generic component model datasets and defined component model datasets, and then creating manufacturing data, on the basis of which the passenger transport system is to be manufactured, by supplementing the commissioning data with production-specific data.

According to a fourth aspect of the disclosure, a computer program product is proposed which comprises machine-readable program instructions which, when executed on a programmable device, cause the device to carry out or control a method according to an embodiment of the first aspect or of the second aspect of the disclosure.

According to a fifth aspect of the disclosure, a computer-readable medium is proposed, on which a computer program product according to an embodiment of the fourth aspect of the disclosure is stored.

Possible features and advantages of embodiments of the disclosure may be considered, inter alia, and without limiting the invention, as being based on the ideas and findings described below.

As noted in the introduction, planning or commissioning a passenger transportation system traditionally required a considerable amount of work. This resulted, among other things, from the fact that at least some of the components present in a passenger transport system had to be planned specifically for an individual specific passenger transport system and had to be adapted to the boundary conditions applicable to this passenger transport system.

For example, in the case of an escalator, the length of the escalator depends on the spatial conditions in the building to be equipped with the escalator. On the one hand, this means that an escalator has to comprise a certain number of steps to be arranged one after the other in order to be able to bring about a desired total length of the escalator. On the other hand, the length of a framework which supports the escalator between support points in the building must be adapted appropriately, so that, for example, a length of upper chords and lower chords, which typically extend over the entire length of the escalator, differs from escalator to escalator. Traditionally, such components, which have to be individually adapted for every single escalator to be manufactured, had to be planned and developed individually and adapted to the specific conditions of the escalator to be manufactured.

In order to reduce the effort involved in this connection, during commissioning of a passenger transport system to be manufactured it is proposed to create a commissioning digital double dataset in a special manner to be explained in detail below. The commissioning digital double dataset should include target data which depicts the characterizing properties of the components used in the manufacture of the passenger transport system in a target configuration. Data from the commissioning digital double dataset can thus, like a digital double or a virtual image, depict the passenger transport system to be manufactured with its target properties that are actually to be achieved.

The characterizing properties to be taken into consideration during creation of the commissioning digital double dataset can be, for example, geometric dimensions of the components, weights of the components, material properties of the components and/or surface conditions of the components. In other words, several different characterizing properties of one component or of several components of a passenger transport system can be determined and stored as data in the commissioning digital double dataset. Geometric dimensions of the components can be, for example, a length, a width, a height, a cross section, radii, roundings, etc. of the components. Material properties of the components can be, for example, a type of material used to form a component or a partial area of a component. Furthermore, material properties can also be strength properties, hardness properties, electrical properties, magnetic properties, optical properties, etc. of the components. Surface conditions of the components can be, for example, roughness, textures, coatings, colors, reflectivities, etc. of the components. The characterizing properties can relate to individual components or component groups. For example, the characterizing properties can relate to individual components, from which larger, more complex component groups are composed. As an alternative or in addition, the properties can also relate to more complex devices composed of several components, such as drive motors, gear units, conveyor chains, etc. The characterizing properties can be determined with high precision, for example, taking into consideration tolerances to be observed during the production of the components.

In other words, the commissioning digital double dataset should contain data which characterize components with which a passenger transport system is to be set up, at least with regard to their geometry, but preferably also with regard to other characterizing properties, such as the material, the surface conditions, etc. The data are to be understood as target data, that is to say they indicate the characterizing properties of the components in a target configuration, that is to say in a configuration that the components should ideally assume according to planning, although the actually manufactured and assembled components usually differ from this to a certain extent due to manufacturing tolerances, assembly tolerances, etc. The data contained in the commissioning digital double dataset should reflect the characterizing properties of the components in sufficient detail to be able to later extract or derive as much information as possible from the commissioning digital double dataset that is needed to actually be able to manufacture the planned passenger transport system.

For this purpose, commissioning data are first created and then modified in such a way as to produce manufacturing data to be used in the manufacture of the passenger transport system. The commissioning data are created taking into consideration or depending on customer-specific configuration data, that is, customer specifications. The manufacturing data is created by further refining or supplementing the commissioning data by taking production-specific data, that is, manufacturing specifications, into consideration.

Customer specifications can be understood to mean specifications which are specified by a customer in individual cases, for example, when ordering the passenger transport system. The customer specifications typically relate to a single passenger transport system to be manufactured. For example, the customer specifications can include prevailing spatial conditions at the installation location, interface information for the attachment of the passenger transport system to the supporting structures of a building, etc. In other words, the customer specifications can specify, for example, what length the passenger transport system should have, what height difference should be overcome, how the passenger transport system should be connected to supporting structures within the building, etc. Customer specifications can also include the customer's wishes with regard to functionality, conveying capacity, appearance, etc. The commissioning data can be present, for example, as a CAD dataset, which, among other things, depicts geometric dimensions and/or other characterizing properties of the components forming the passenger transport system.

The manufacturing specifications typically relate to properties or specifications within a manufacturing plant or production line in which the passenger transport system is to be manufactured. For example, depending on the country or location in which a manufacturing plant is located, various conditions may prevail in the manufacturing plant and/or requirements may have to be met. For example, in some manufacturing plants certain materials, raw materials, raw components or the like may not be available or may not be processed. In some manufacturing plants, machines can be used that are missing in other manufacturing plants. Due to their layout, some manufacturing plants are subject to restrictions with regard to the passenger transport systems or components thereof to be manufactured there. Some manufacturing plants enable a high degree of automated manufacture, whereas other manufacturing plants can use manual manufacture, for example, due to low labor costs. There may be a large number of further conditions and/or requirements with respect to which manufacturing environments can differ. All of these manufacturing specifications typically have to be taken into consideration during planning or commissioning of a passenger transport system, since the way in which a passenger transport system can actually be built can depend on them. If necessary, it may be necessary to fundamentally modify the commissioning data initially created, which only took the customer specifications into consideration, in order to be able to take the manufacturing specifications into account.

Specifically, on the one hand, generic component model datasets and, on the other hand, defined component model datasets should be used during creation of the commissioning data. In contrast to the defined component model datasets, the generic component model datasets do not describe a component in all of its properties that are essential for manufacture. On the basis of generic component model datasets, a whole group of components can be commissioned or designed in a simple manner by adapting data from the associated generic component model dataset on a case-by-case basis.

More specifically, and according to one embodiment of the disclosure, the defined component model datasets are datasets that reflect a planned configuration of individual components with respect to all the characterizing properties that are essential for the manufacture of the passenger transport system. The generic component model datasets are datasets that reflect a planned configuration of several different components with respect to several characterizing properties that are essential for the manufacture of the passenger transport system, such that a generic component model dataset can be supplemented with data by taking into consideration the previously collected customer-specific configuration data in such a way that it depicts a single component with respect to all the characterizing features that are essential for the manufacture of the passenger transport system.

In other words, defined component model datasets can be understood as digital images of physical components. For example, they can be in the form of a 3D CAD dataset and can at least sufficiently completely depict at least the geometry, but preferably also other characterizing properties, of a component in such a way that the component can be manufactured on this basis with sufficient precision for its use. A defined component model dataset can be specified, for example, as a three-dimensional body shell of the component. Tolerance information, surface information, for example, on color, texture, surface sadness, etc., information on material properties and interface information on adjacent components can also be included in the data of the defined component model dataset.

Defined component model datasets are provided in particular for components which are standardized and/or are used in many different ways in various passenger transport systems. For example, when commissioning an escalator or moving walkway, standardized, defined component model datasets of simple components such as screws, chain links of a conveyor chain, etc. are used. However, it is also possible to use defined component model datasets of more complex components, but these are used in the same configuration or a selection from a few possible configurations for different passenger transport systems. For example, defined component model datasets of handrail inlet caps, which are the same for all escalators, or of treads or pallets, which are provided in small numbers with different widths for escalators or moving walkways with different conveying capacities, can be used.

In contrast to defined component model datasets, generic component model datasets initially do not state the characterizing properties so completely that a component could already be manufactured only on the basis of the generic component model dataset. For example, a generic component model dataset of a component can be under-determined at least with regard to a property that is essential for production. A generic component model dataset of a component can thus be seen as an "unfinished three-dimensional component model." One advantage of this is that the generic component model dataset can be used to represent several different components because it is under-determined with respect to at least one characterizing property, the different components only differing from one another with regard to the under-determined characterizing property.

Generic component model datasets can be made available when commissioning a passenger transport system, for example, for components that are used in different passenger transport systems in a similar, but not an identical configuration. The generic component model dataset can predefine all the characterizing properties with respect to which the various components are configured in the same way, but the characterizing properties with respect to which the components differ can be under-determined.

For example, the upper and lower chords of a framework of an escalator or moving walkway can differ massively in terms of their length, depending on how long the escalator or moving walkway should be, whereas a cross-sectional geometry of the upper chords and lower chords can be chosen identically, independent of the length of the framework for all escalators or moving walkways. In this specific case, the generic component model dataset of an upper chord or lower chord is completely defined with regard to the cross-sectional geometry, but is under-determined with regard to the length.

In order to create data from the generic component model dataset that sufficiently characterize the component with regard to all the characteristics that are essential for the manufacture of the passenger transport system, the data of the generic component model dataset must therefore be supplemented during the commissioning of the passenger transport system in such a way that initially under-determined data are specified with regard to characterizing properties of the component and thus are sufficiently determined. This can take place by extracting and/or processing information from the customer-specific configuration data during commissioning in such a way that the under-determined data can be specified thereby.

In the example mentioned, this can mean that when commissioning an escalator or moving walkway, the upper and lower chords are commissioned by their framework by specifying associated generic component model datasets with regard to the length that is not initially specified. The length of the upper and lower chords is derived from the customer-specific configuration data, that is, for example, from distances between support points at which opposing ends of the framework are to be installed in the receiving structure and, if necessary, from a height difference between these support points.

The fact that the commissioning digital double dataset is created not only from previously defined component model datasets but also from generic component model datasets to be specified during commissioning can simplify the entire commissioning process and/or can be used for planning and manufacturing various passenger transport systems that differ, for example, in terms of their geometric dimensions. The proposed commissioning process can thus be used in general for commissioning different passenger transport systems. In particular, the proposed commissioning process can be implemented largely or even completely automatically.

According to one embodiment of the disclosure, during creation of the commissioning data a virtual image of the passenger transport system is generated using generic component model datasets of the passenger transport system and including the customer specifications.

In other words, it can be advantageous to create a virtual image of the passenger transport system during the initial commissioning or planning of the passenger transport system, taking into consideration the customer specifications, in which the components forming the passenger transport system are shown, for example, with regard to their desired properties. The virtual image can be designed as a kind of wire frame or wire lattice. Components to be used can form structures of this wire frame or lattice. The image of the entire passenger transport system can be assembled from predefined component model datasets and situation-specific, defined component model datasets.

According to one embodiment of the disclosure, static and/or dynamic simulations are carried out when the commissioning data are created. The commissioning digital double dataset is created taking into consideration the results of the simulations.

In other words, to create the commissioning data, which, taking the customer specifications into consideration, form the basis of the commissioning digital double dataset, simulations can be carried out with which static and/or dynamic properties of the commissioned passenger transport system are simulated. For example, simulations can be carried out in a computer system.

Static simulations analyze, for example, a static interaction of several assembled components. With the help of static simulations, it can be analyzed, for example, whether complications can arise during assembly of several predefined components or components specified appropriately based on generic component model datasets, for example, because each of the components is manufactured with certain manufacturing tolerances, so that if the manufacturing tolerances add up unfavorably summation this can cause problems.

Dynamic simulations, for example, analyze the dynamic behavior of components during the operation of the assembled passenger transport system. Dynamic simulations can be used, for example, to analyze whether moving components within a passenger transport system can be moved in a desired manner or whether, for example, there is a risk of collisions between moving components.

According to one embodiment of the present disclosure, the passenger transport system is an escalator or moving walkway, and the components of the passenger transport system also comprise components of a framework, which have upper chords, lower chords, uprights, cross struts, diagonal struts, junction plates, supporting angle brackets and/or framework separation points.

In a specific embodiment of this embodiment, generic component datasets of the framework are undetermined with regard to a dimension, in particular a length, of the respective component. During creation of the commissioning digital double dataset, the commissioning data is then created taking into consideration previously collected, customer-specific configuration data from the generic component model datasets by calculating and supplementing data relating to the undetermined dimension, taking the customer-specific configuration data into consideration.

In other words, a passenger transport system in the form of an escalator or moving walkway can be composed of a large number of components which, on the one hand, form a framework, which represents a supporting structure of the passenger transport system, and, on the other hand, form, for example, a conveyor device which is held by the framework and with the help of which passengers can be transported along a travel path. In particular, the framework is made up of a large number of individual components during its manufacture, but must ultimately be installed as a unit in the building and thereby satisfy the spatial conditions in the building as well as other customer specifications.

In order to be able to achieve this, the framework can be partially built using standardized components, for example, using standardized uprights, cross struts, diagonal struts, junction plates, etc. Such standardized components can be commissioned using defined component model datasets.

In order to be able to take into account the varying dimensions, in particular lengths, of the framework which are required for the specific case, other components of the framework will not be able to be built up using standardized components. Instead, such individually dimensioned components are commissioned using generic component model datasets. A generic component model dataset that characterizes the non-standardized component is specified during commissioning with regard to its initially undetermined data.

For example, the generic component model dataset of an upper chord or a lower chord can initially be under-determined with regard to a length and then specified during the commissioning process with regard to the length by calculating or deriving this length based on the customer specifications.

According to one embodiment of the present disclosure, the passenger transport system is an elevator and the components of the passenger transport system are components of a supporting structure which comprises guide rails, wall fastenings, a drive frame, floor fastenings, cross struts, longitudinal struts and/or diagonal struts.

In a specific configuration of this embodiment, generic component model datasets of the support structure are undetermined with regard to a dimension, in particular a length, of the component. When the commissioning digital double dataset is created, the commissioning data is created from the generic component model datasets, taking into consideration previously collected, customer-specific configuration data, e.g., customer specifications, by calculating and supplementing data relating to the undetermined dimension, taking the customer-specific configuration data into consideration.

The commissioning digital double dataset for the elevator can be created in an analogous manner, as is described here primarily for the configuration of the passenger transport system as an escalator or moving walkway.

According to an embodiment of the manufacturing method according to the second aspect of the present disclosure, the manufacturing method additionally includes creating a completion digital double dataset based on the commissioning digital double dataset by measuring actual data, which depicts characterizing properties of components of the passenger transportation system in an actual configuration of the passenger transport system immediately after assembly and installation thereof in a building and a replacement of target data in the commissioning digital double dataset by corresponding actual data.

In other words, during manufacture of a passenger transport system, not only can a commissioning digital double dataset be created that is used as a virtual image of the passenger transport system to be manufactured during a manufacturing process, but this commissioning digital double dataset can be further processed after completion of the passenger transport system by replacing the target data originally contained therein with actually measured actual data of the characterizing properties of the components of the passenger transport system.

The resulting completion digital double dataset is thus a virtual image of the passenger transport system in an actual configuration after assembly and installation thereof. On the basis of this completion digital double dataset, for example, a state of the passenger transport system can be monitored, as is described in more detail in a further patent application filed in parallel with the present patent application (see details below).

In particular, an updated digital double dataset can be created based on the completion digital double dataset by modifying the completion digital double dataset during the operation of the passenger transport system, taking into consideration measured values which depicts changes in the characterizing properties of components of the passenger transport system during operation thereof. Such measured values can be provided, for example, by sensors integrated into the passenger transport system or arranged on the passenger transport system. The updated digital double dataset can be used during the operation of the passenger transport system in order to be able to monitor a current state of the passenger transport system. For example, signs of wear or defects on the passenger transport system can be identified on the basis of deviations of the virtual image of the passenger transport system depicted by the updated digital double dataset from previously known target specifications. Based on this, for example, maintenance or repair measures can be planned or initiated. Advantageously, details of such maintenance or repair measures can be planned purely on the basis of an analysis of their virtual image, without a technician having to inspect the real passenger transport system on site beforehand. This enables considerable savings in effort and costs.

Logically, all of the characterizing properties of a component that are present as target data do not necessarily have to be updated by actual data of the component. As a result, the characterizing properties of most components of a completion digital double dataset or updated digital double dataset are characterized by a mixture of target data and actual data.

Embodiments of the method presented here for commissioning or for manufacturing a passenger transport system to be manufactured can be carried out using a device specially configured for this purpose. The device may comprise one or more computers. In particular, the device can be formed from a computer network which processes data in the form of a data cloud. For this purpose, the device can have a store in which the data of the digital double dataset can be stored, for example, in electronic or magnetic form. The device can also have data processing options. For example, the device can have a processor, by means of which data from the digital double dataset can be processed. Furthermore, the device can have interfaces via which data can be input into the device and/or output from the device. In particular, the device can be connected to sensors which are arranged on or in the passenger transport system and by means of which the characterizing properties of components of the passenger transport system can be measured. In principle, the device can be part of the passenger transport system. However, the device is preferably not arranged in the passenger transport system, but rather remote from it, for example, in a remote control center, from which the state of the passenger transport system is to be monitored. The device can also be implemented in a spatially distributed manner, for example, when data are processed in a data cloud and distributed over several computers.

In particular, the device can be programmable, that is to say it can be caused by a suitably programmed computer program product to execute or control the method according to the disclosure. The computer program product can contain instructions or code which, for example, cause the processor of the device to store, read, process, modify, etc., data of the digital double dataset. The computer program product can be written in any computer language.

The computer program product can be stored on any computer-readable medium, for example, a flash memory, a CD, a DVD, RAM, ROM, PROM, EPROM, etc. The computer program product and/or the data to be processed with it can also be stored on a server or several servers, for example, a data cloud, from where they can be downloaded via a network, for example, the Internet.

Finally, it is pointed out that some of the possible features and advantages of the invention are described herein with reference to different embodiments of both the proposed method and the correspondingly designed device for commissioning or manufacturing a passenger transport system. A person skilled in the art recognizes that the features can be combined, transferred, adapted, or replaced in a suitable manner in order to arrive at further embodiments of the disclosure.

BRIEF DESCRIPTION OF THE DRAWINGS

Embodiments of the disclosure will be described in the following with reference to the accompanying drawings, although neither the drawings nor the description should be construed as limiting the invention.

FIG. 5 shows a diagram to illustrate method steps in the context of a method according to the disclosure.

The figures are merely schematic and not true to scale. Like reference signs designate like or equivalent features in the various figures.

DETAILED DESCRIPTION

First, passenger transport systems to be commissioned or manufactured are described briefly and only very schematically with regard to the components used therein.

Figure 1:
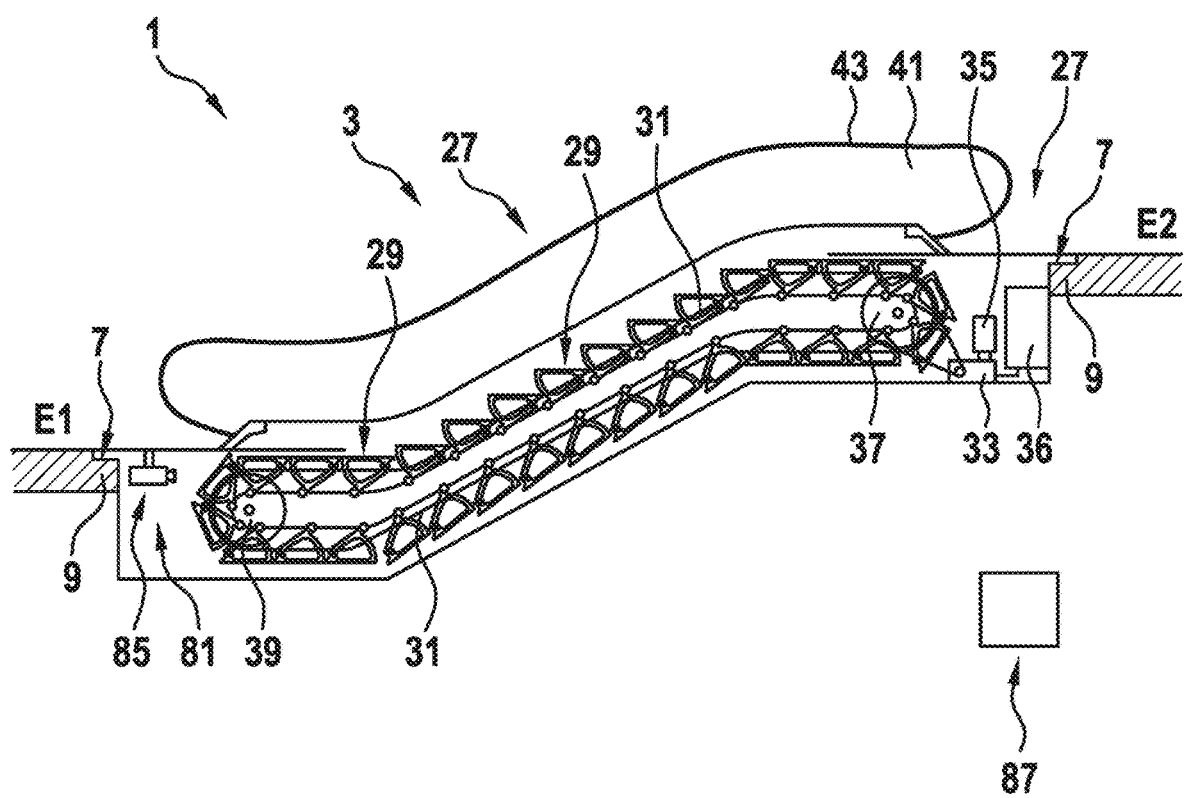
FIG. 1 shows a passenger transport system in the form of an escalator, with respect to which a method according to the disclosure can be carried out.
Figure 2:
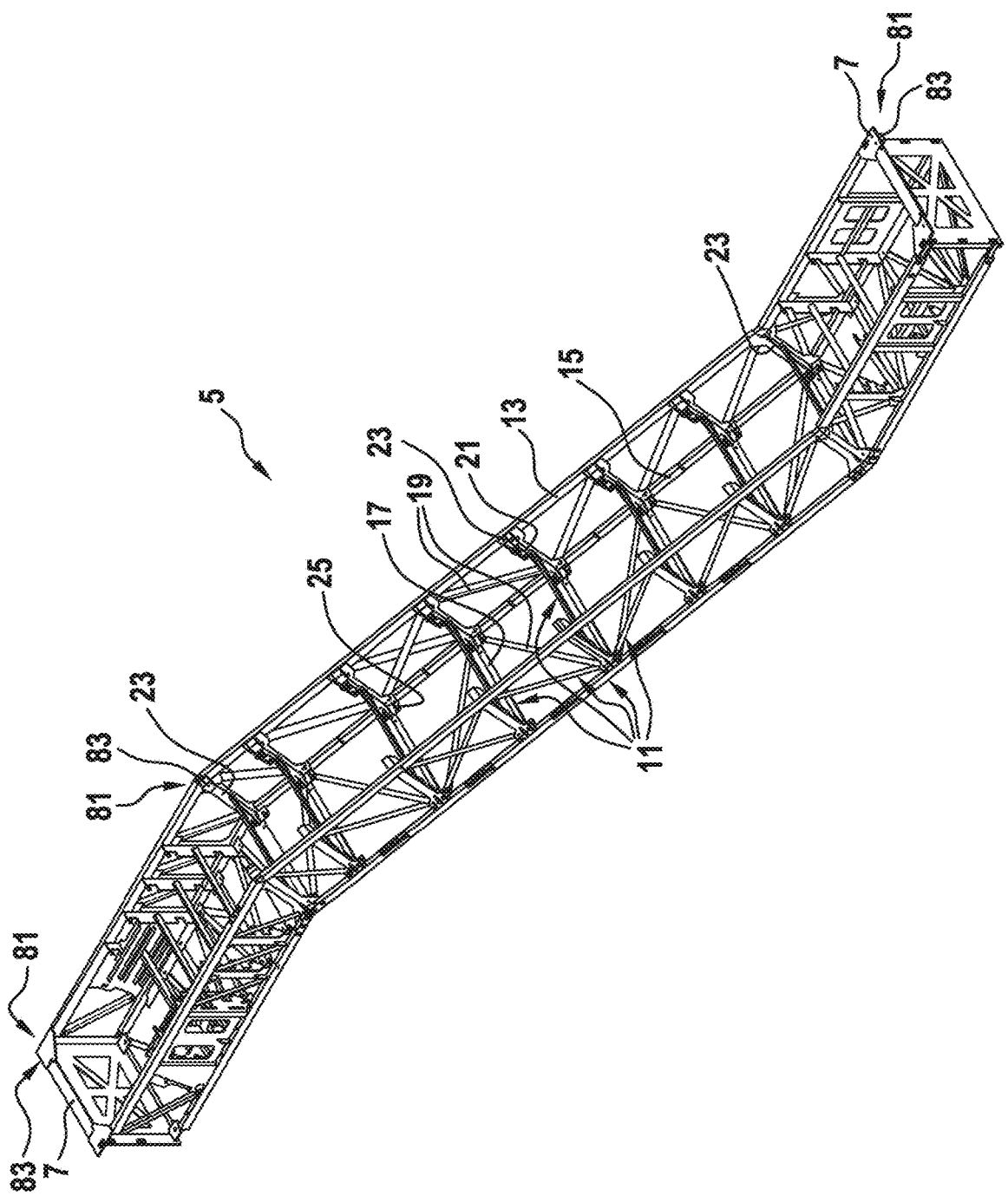
FIG. 2 shows a supporting framework for an escalator.

FIG. 1 shows a passenger transport system 1 in the form of an escalator 3, which can be commissioned or manufactured using the method described here. FIG. 2 shows a supporting framework 5 of an escalator 3, which is not shown in FIG. 1 for reasons of clarity.

The escalator 3 connects areas E1 and E2 in a building which are located at different heights and are spaced apart horizontally. The framework 5 here forms a supporting structure and rests at its opposite ends with supporting angle brackets 7 on support points 9 of the building. The framework 5 is composed of a large number of components 11, in particular of upper chords 13, lower chords 15, cross struts 17, diagonal struts 19, uprights 21, framework separation points 23 and junction plates 25. Many of the components 11 of the framework 5 consist at least partially of elongated metal profiles. Dimensions of the components 11 are selected so that framework 5, on the one hand, can span a space between opposing support points 9 of the building and, on the other hand, is sufficiently stable to withstand the forces acting on the escalator 3 formed with the framework 5.

The escalator 3 comprises a conveyor device 27, which is held by the framework 5 and by means of which passengers can be transported between the two areas E1 and E2. The conveyor device 27 includes, among other things, drive stages 29, conveyor chains 31, a drive machine 33, a service brake 35, a controller 36, drive sprockets 37 driven by the drive machine 33 and return sprockets 39. The escalator 3 further comprises a balustrade 41 with a handrail 43 running around it.

Alternatively, the passenger transport system 1 can also be designed as a moving walkway (not shown) which is constructed similarly or identically to an escalator 3 with regard to many of its components 11.

Figure 3:
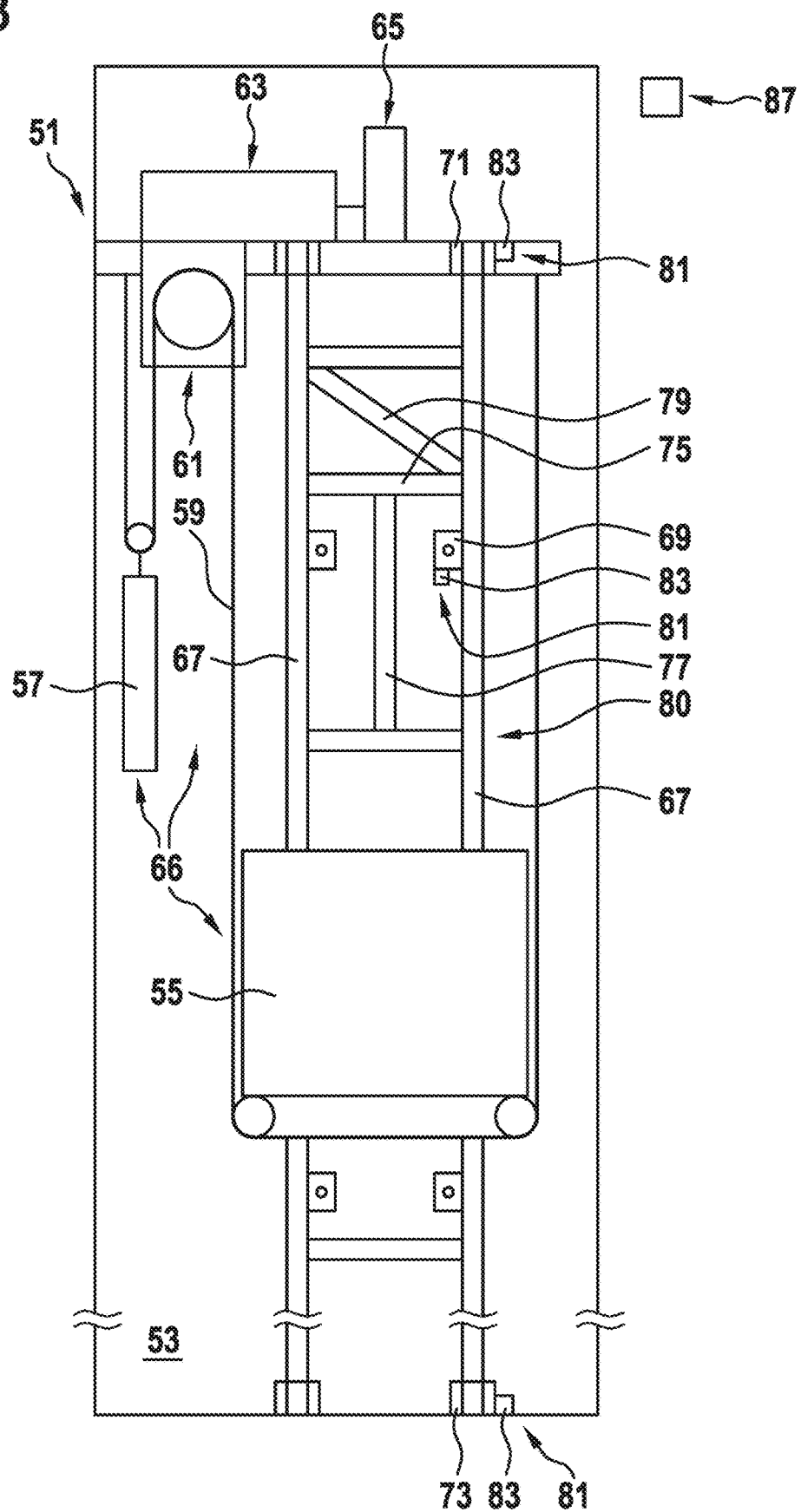
FIG. 3 shows a passenger transport system in the form of an elevator, with respect to which a method according to the disclosure can be carried out.

In a further alternative embodiment, the passenger transport system 1 is designed as an elevator 51. An exemplary elevator 51 is shown in FIG. 3. The elevator 51 has an elevator shaft 53 in which a conveyor device 66 and a support structure 80 holding this conveyor device 66 are accommodated. An elevator car 55 and a counterweight 57 are suspended on support means or device 59 in the form of belts. A drive machine 61 and a braking device 63 drive the support means 59 or brake them if necessary. A controller 65 controls the operation of the elevator 51. The elevator car 55 and possibly also the counterweight 57 are guided by guide rails 67 as they move through the elevator shaft 53. The guide rails 67 are connected to supporting structures within the elevator shaft 53 via wall fastenings 69 and floor fastenings 73. Furthermore, cross struts 75, longitudinal struts 77 and diagonal struts 79 may ensure sufficient mechanical stabilization of the guide rails 67. The guide rails also carry a drive frame 71, to which the ends of the support means 59 as well as the drive machine 61, the braking device 63 and the controller 65 are fastened.

The product life cycle of an escalator 3, a moving walkway or an elevator 51 is accompanied by various software systems and databases. These are generally not linked to one another to such an extent that the data they contain is automatically available throughout all systems. Since a product development, an order-specific configuration through sales, and production documents and data specified on the basis of this configuration are sometimes not sufficiently consistently linked with each other, there is usually no consistent support and documentation in the after-sales area. This can lead, for example, to the fact that a service technician often first has to examine a passenger transport system 1 on site in order to then carry out appropriate measures, such as, for example, procuring the necessary material, setting deadlines for maintenance and repair, properly disposing of the dismantled material, etc.

The method according to the disclosure provides for the real product to be accompanied by a digital double, preferably continuously for the entire product life cycle, that is to say not only during the commissioning or manufacturing of the passenger transport system 1, but also after its completion and during its subsequent operation.

A digital double dataset representing the digital double can already be created during or in preparation for the manufacturing process based on commissioning data, taking into consideration customer specifications, as a commissioning digital double dataset, for example, using CAD data used during planning.

For example, the creation of the digital double can be started first, for example, by creating a digital double in the engineering stage from defined component model datasets and generic component model datasets, including the customer specifications, (e.g., an order-specific, generated parts list, such as is sometimes also designated as an EBOM (Engineering Bill of Materials).

The defined component model datasets are datasets that comprehensively describe the target properties of a component such that the respective component can be manufactured and assembled in the passenger transport system. For example, a defined component model dataset describes a component, with sufficient precision for its manufacture, with regard to its manufacturing-related characterizing properties such as, for example, geometry, shape, contour, weight, material, surface conditions, coatings, information on interfaces to adjacent components and the like.

The generic component model datasets also contain component data such as their dimensions, surface structures, other characterizing properties, information on interfaces to adjacent components and the like. However, a generic component model dataset does not yet describe a specific component to such an extent that the respective component can be manufactured and assembled in the passenger transport system based on this description alone.

Rather, in a generic component model dataset, at least one of the characterizing properties, which would have to be clearly defined so that the component can be manufactured, has not yet been defined, that is to say the generic component model dataset is under-determined with regard to this property. Accordingly, the generic component model dataset must be specified taking into consideration the customer specifications with regard to the under-determined property.

Using the example of a generic component model dataset for an upper chord of an escalator framework 5, this can mean that its length is calculated on the basis of customer specifications, so that the upper chord 13 or the framework 5 built therewith is long enough to provide an intermediate space between support points 9 within the building to be spanned. Subsequently, the under-determined data in the generic component model dataset are specified accordingly, so that the specified generic component model dataset, like a defined component model dataset, contains all the production-relevant data.

Figure 4:
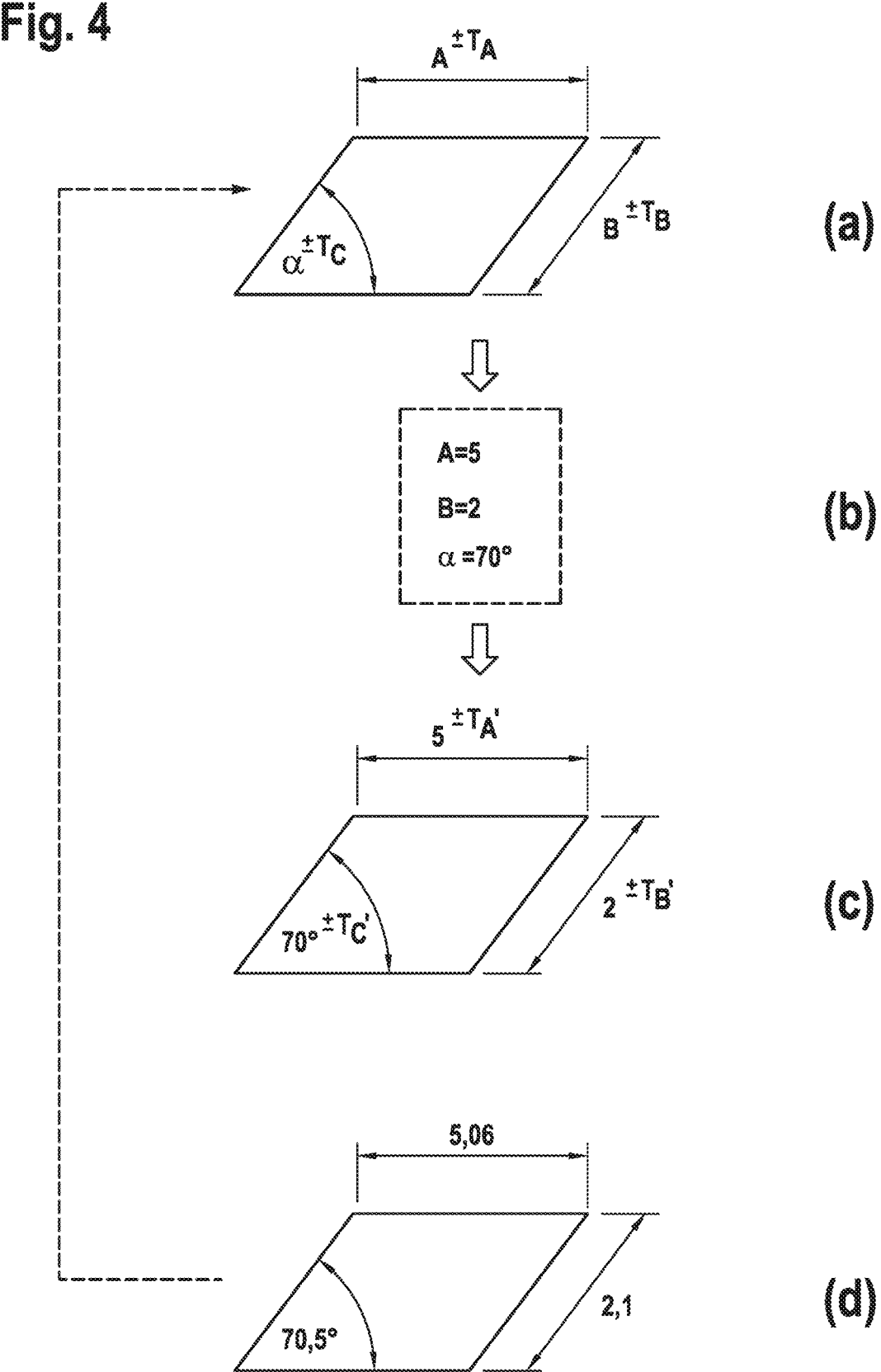
FIG. 4 illustrates the creation of a digital double dataset using the example of a component shown in a simplified form.

In order to clarify possible configurations of method steps which are to be carried out when creating a digital double dataset based on generic component model datasets, this process is explained by way of example with reference to FIG. 4. It shows how a digital double dataset is created for a very simple component in the form of a parallelogram-shaped sheet.

First, a generic component model dataset of the component is generated as part of a research and development (R&D) (see FIG. 4(*a*)). In this case, target values relating to characterizing properties to be achieved are determined for the component. In the example shown, target variables A, B, α of geometric properties, that is to say a width, a height and an angle of the parallelogram, are determined. Furthermore, an associated tolerance range $T_A$, $T_B$, $T_C$ is defined for each target variable. The sheet thickness is the same for all design variants of this component and thus belongs to the defined characterizing properties of this generic component model dataset.

Then, customer specifications are set during the distribution of the passenger transportation system (see FIG. 4 (*b*)). Based on these customer specifications, a target value suitable for the specific passenger transport system is determined for each of the target variables. In the example shown, the width is set to A=5, the height to B=2 and the angle to α=70°. This definition turns the generic component model dataset into a defined component model dataset of the component described by commissioning data. This defined component model dataset can serve as EBOM.

The commissioning data of the defined component model dataset of the component are then specified in such a way that the previously determined target values are modified to take production data into consideration only on the basis of the customer specifications. For example, material information from the country of manufacture, an OEM manufacturer, or the like can be taken into consideration. This ultimately supplements the commissioning data of the commissioning digital double dataset in the form of an MBOM identified as manufacturing data, which can be used in the manufacture of the component and serves as a virtual image of the component to be manufactured. In this case, the determination of tolerance specifications $T_A'$, $T_B'$, $T_C'$ also takes into consideration the manufacturing specifications that actually prevail during manufacture.

Finally, at least some of the characterizing properties of the component produced using the manufacturing data are measured. In the illustrated case, the dimensions of the component are measured in their actual configuration (actual values) after their assembly to form the passenger transport system and the installation of the passenger transport system. Since the characterizing properties of the material do not change during production, it can only be checked, for example, whether the correct material was used, but without checking all the material properties such as tensile strength, shear strength, flexural fatigue strength, impact strength, corrosion behavior, crystalline structure, alloy components and the like. If necessary, the dimensions of the component in its actual configuration can also be repeatedly measured during operation of the passenger transport system based on sensor signals. In this way, for example, deviations of the actual values on installed and possibly operated components from the associated target values can be determined. In the example shown, such deviations are $\Delta A=0.06$, $\Delta B=0.1$ and $\Delta C=0.5°$.

The deviations found can, for example, be statistically analyzed for several components of a component type. Results can be taken into consideration, for example, when researching and developing a modified generic component model dataset of the affected component type.

With reference to FIG. 5, process steps of an exemplary method sequence are now described, by means of which commissioning data of the commissioning digital double dataset are created for manufacturing an escalator. FIG. 5(a) shows the method sequence with its main process steps S0 to S8. In FIG. 5(b) associated sub-process steps S1', S1", S2', ... S8' are specified for each of the main process steps S1 to S8.

Starting from an initial or starting point A, the commissioning process is initialized in a first step S0.

In the subsequent step S1, 3D sales representations are retrieved. The customer-specific configuration data are first queried step by step (step S1') and then inserted into the 3D sales representations (step S1").

The so-called top layout is then implemented in step S2. For this purpose, corner points of the top layout are first determined in three-dimensional space (Schritt S2') on the basis of the coordinates queried in the sales representation. Then, on the basis of a set of conditional formulas, further corner points are determined, such as, for example, the corner points that are usual for escalators between the horizontal sections and the inclined middle part of the escalator (step S2"). Finally, the top layout is created by connecting the corner points (step S2'").

The framework design is then generated (step S3). First, a corresponding program interface is initialized (step S3'), then a two-dimensional framework wire frame including the top layout is generated (step S3"), and finally, if necessary due to the requested customer-specific configuration data, a framework sectioning is carried out (step S3'") and finally a three-dimensional framework consisting of defined and generic component model datasets is created (step S3"").

Next, the brake calculation is started (step S4), braking performance data being extracted (step S4') from the customer-specific configuration data (maximum conveying capacity, conveying height, application environment, etc.). A brake calculation model is then run in order to arrive at the optimal brake design (step S4").

Next, the drive calculation is started (step S5), again braking power data being extracted from the customer-specific configuration data (maximum conveying capacity, conveying height, application environment, etc.) (step S5') and then a drive calculation model is run in order to achieve the optimal drive design (step S5").

The digital double or the commissioning data is then generated (step S6). Defined component model datasets of these components, including the customer-specific configuration data, are generated (step S6') from further generic component model datasets (handrail, balustrades, cladding panels, etc.). Furthermore, the number of defined component model datasets to be used and the number of defined component model datasets generated from generic component model datasets is determined (step S6"). These are then inserted (Schritt S6'") into the already created three-dimensional framework on the basis of their interface information. Furthermore, defined component model datasets (of the correct motor type) of the components are generated (step S6"") on the basis of the previously calculated data of the brake calculation and drive calculation from generic component model datasets (for example, from the necessary motor power). These are also inserted in the three-dimensional framework already provided by defined component model datasets on the basis of their interface information (step S6""').

The commissioning data of the commissioning digital double dataset generated in this way are then checked (step S7), this check being carried out using various simulations such as static simulations, for example, in the form of tolerance considerations, and dynamic simulations, for example, for collision checking (step S7').

Finally, the commissioning data of the commissioning digital double dataset are output as an order-specific, generated parts list EBOM (Engineering Bill of Material) (step S8, S8') before the method sequence is ended (step E).

Furthermore, the commissioning data can be supplemented with associated production data, taking into consideration manufacturing specifications for manufacturing data or for the production-compatible parts list (manufacturing BOM; MBOM). The commissioning digital double dataset thus supplemented or the manufacturing data thus created include target data which represent a virtual image of the passenger transport system 1 to be manufactured. The passenger transport system 1 can then be manufactured based on these manufacturing data.

After completion of the passenger transport system 1, the target data contained in the commissioning digital double dataset can be replaced or supplemented by actual data, such as can be obtained by measuring the actual configuration of the manufactured passenger transport system 1. This results in the completion digital double dataset.

This completion digital double dataset already contains data which reflect the characterizing properties of the components 11 installed in the passenger transport system 1 in their actual configuration, that is to say after the passenger transport system has been completed and installed in the building. Thus the completion digital double dataset can already be used as an updated digital double dataset for monitoring properties of the passenger transport system 1. For this purpose, the completion digital double dataset can be stored and processed, for example, in a monitoring device 87, which can be arranged in a remote control center.

For example, the actual values of component properties contained in the completion digital double dataset, as they actually exist in the passenger transport system 1, can be compared with target values assumed during commissioning. Conclusions can be drawn, for example, from any differences between the actual values and the target values that are recognized in the future of properties of the passenger transport system 1 to be expected in the future. For example, based on such differences, it can be predicted when certain signs of wear are to be expected, which in turn can be used to estimate when and/or how first maintenance measures are likely to be necessary. In other words, based on the completion digital double dataset, an estimation or simulation of future characterizing properties of the passenger transport system 1 can take place and thus maintenance work to be carried out in the future can be planned.

In order to be able to provide a digital double of the passenger transport system 1 even during operation, at least some of the data contained in the completion digital double dataset are updated from time to time during the operation of the passenger transport system. For this purpose, in the passenger transport system 1 sensors can be provided, by means of which measured values can be ascertained which depict changes in the characterizing properties of components 11 of the passenger transport system 1 during operation thereof. Taking these measured values into consideration, the data contained in the completion digital double dataset can be modified. Thus the updated digital double dataset generated in this way also represents a virtual image of a continuously updated state of the passenger transport system 1 in its actual configuration during operation.

Using the commissioning digital double dataset created during commissioning of the passenger transport system, the passenger transport system can thus be manufactured in an advantageous and simplified manner. On the other hand, using the digital double of the passenger transport system or the updated digital double dataset thereof, both statements about the currently prevailing state of the passenger transport system 1, for example, by comparison with target values or expected values, and also statements about a future state of the passenger transport system 1 can be made later, for example, by means of simulations or extrapolations based on the data of the updated digital double dataset. In this way, for example, maintenance work to be carried out can be planned according to the situation and in a targeted manner.

In order to be able to measure the currently prevailing actual characterizing properties of components 11 in the passenger transport system 1, various sensors 81 can be provided in the passenger transport system 1, by means of which certain characterizing parameters can be monitored, which allow conclusions to be drawn about changes in the characterizing properties of the components 11 of the passenger transport system 1. A variety of very different sensors 81 can generally be used for this purpose. Force sensors 83, which can measure the forces acting on the various wall fastenings 69 and floor fastenings 73 as well as on the drive frame 71, are shown in the elevator 51 only by way of example, as a result of which conclusions can be drawn about the forces acting on the guide rails 61 and thus, for example, about any mechanical tensions. For a passenger transport system 1 in the form of an escalator 3, a camera system 85 is shown only by way of example, by means of which the state of, for example, driving stages 29 or the conveyor chains 31 can be monitored for any wear that may occur. In addition, force sensors 83 can also be provided in the framework 5, for example, similarly to the elevator 51. The sensors can transmit their signals to the monitoring device 87, for example, by wire or via a radio network.

In the following, the creation of a commissioning digital double dataset will be described specifically for an example in which a passenger transport system 1 in the form of an escalator 3 is to be planned and then manufactured.

The generation of an order-specific generated parts list (EBOM) of a framework 5 for the escalator 3 can be used as an example of the interaction of generic component model datasets and the customer specification. In its customer specification the customer defines the details that are relevant for the design of the framework 5, such as an area of application (department store, public building such as a train station, subway etc.), a conveying height, a step width (and thus a conveying capacity), a length (an angle of the inclined area between the access areas being determined from the length and the conveying height) and the type of balustrade (e.g. glass balustrade, balustrade for traffic escalators). The individual component parts 11 of the framework 5, such as upper chords 13, lower chords 15, cross struts 17, supporting angle brackets 7, framework separation points 23, etc., as well as defined component model datasets such as uprights 21, diagonal struts 19, junction plates 25, etc. are available as generic component model datasets, and, for example, the length of the upper chords 13 and lower chords 15, the length of the cross struts 17 and the number of uprights 21 are dependent on the customer specifications. According to the entered customer specifications, the individual components 11 of the framework 5 with their specific dimensions are generated from the generic and defined component model datasets. The design is carried out, for example, in such a way that a so-called virtual wire structure of the framework 5 is created using the customer specifications "conveying height," "horizontal spacing of the supporting angle brackets," "step width" and/or "conveying capacity." The individual components 11 are now designed on the basis of this virtual wire structure, in particular with regard to their dimensions, in particular their lengths, and their number. The customer specifications also show how many framework separation points 23 are to be made so that the escalator 3 can be brought into the building in segments, for example. Because of the framework separation points 23, other parts may be required and the upper chords 13 and lower chords 15 are usually multiple parts.

In an analogous manner, an EBOM can also be created for an elevator 51 by determining a target configuration for a conveyor device 66 and a support structure 80, taking customer specifications into consideration. For example, a size of the elevator car 55, a weight of the counterweight 57, a design of the support means 59, of the drive machine 61 and of the braking device 63 and of the controller 65 can be suitably selected. Furthermore, dimensions and other characterizing properties of the guide rails 67, the wall fastenings 69, the drive frame 71, the floor fastenings 73, the cross struts 75, the longitudinal struts 77, the diagonal struts 79 and shaft doors and car doors (not shown) can be selected appropriately. Associated data can be stored in the commission digital double dataset.

The framework 5 can again serve as an example of the MBOM generated from the EBOM. Production-specific rules concern, for example, the material qualities available at the production site or the manufacturing quality of the means of production depending on the production site. Another influencing factor can be the production layout of the manufacturing facility, which may not allow all desirable production processes. Characterizing properties of the component model datasets of the components are modified accordingly, and flow plans and the like are added.

The passenger transport system is manufactured on the basis of the manufacturing data (MBOM), with the manufacturing data being replaced by the physical data, that is to say actual values taken from the physical product, as manufacturing progresses. Here, for example, the real component dimensions and the assembly-relevant data such as, inter alia, tightening torques of screw connections, points of use of lubricants and the like are collected and transmitted to the digital double or commissioning digital double dataset, thereby mutating it into the completion digital double dataset. When the passenger transport system is delivered, a digital double or completion digital double dataset exists in parallel to it, which ideally corresponds exactly to the physical product.

During installation of the passenger transport system in the building and during commissioning, additional data such as the operating data and measurement data transmitted by sensors can be updated in the digital double, so that the completion digital double dataset is mutated to the updated digital double dataset. This happens also continuously or periodically even after commissioning.

Periodic queries on the digital double, such as wear-related geometric changes, can be evaluated by means of collision simulations and maintenance work can be planned. Maintenance instructions for maintenance personnel can also be generated with the help of the digital double. Consequently, when components are replaced during maintenance, their defined component model datasets are updated in the digital double of this passenger transport system with the actual data corresponding to the newly installed physical component. In the end, the individual components can be evaluated and passed on in an environmentally friendly manner for further use, processing or disposal before the installation is shut down.

Finally, it should be noted that terms such as "having," "comprising," etc. do not preclude other elements or steps and terms such as "a" or "an" do not preclude a plurality. Furthermore, it should be noted that features or steps that have been described with reference to one of the above embodiments can also be used in combination with other features or steps of other embodiments described above. Reference signs in the claims are not to be interpreted as delimiting.

The invention claimed is:

1. A method for commissioning a passenger transport system to be manufactured, the method comprising:
   creating a commissioning digital double dataset for a passenger transport system with target data which depicts characterizing properties of components of the passenger transport system in a target configuration,
   wherein the creation of the commissioning digital double dataset comprises:
      firstly, creating commissioning data from generic component model datasets and defined component model datasets by taking into consideration previously collected customer-specific configuration data, and
      subsequently, creating manufacturing data that specify the target configuration by supplementing the commissioning data with production-specific data,
   wherein a defined component model dataset depicts a configuration of an individual component with respect to all the characterizing properties that are related to its manufacture, and
   wherein a generic component model dataset permits a configuration of several different components and depicts several characterizing properties that are related to its manufacture so that a generic component model dataset can be supplemented by taking into consideration the previously collected customer-specific configuration data in such a way that this is converted into a single, defined component model dataset which depicts characterizing properties for manufacturing the passenger transport system.

2. The method according to claim 1, wherein, when the commissioning data is created, a virtual image of the passenger transport system is generated using generic component model datasets of the passenger transport system and including the customer specifications.

3. The method of claim 1, wherein simulations from a group comprising static and dynamic simulations are carried out when the commissioning data is created, and wherein the commissioning digital double dataset is created taking the results of the simulations into consideration.

4. The method of claim 1, wherein the passenger transport system is selected from a group comprising escalators and moving walkways, and wherein the component model datasets of the passenger transport system comprise component model datasets of a framework comprising several component model datasets selected from a group comprising upper chord component model datasets, lower chord component model datasets, upright component model datasets, cross strut component model datasets, diagonal strut component model datasets, junction plate component model datasets, supporting angle bracket component model datasets and framework separation point component model datasets.

5. The method of claim 4, wherein the generic component model datasets of the framework are undetermined with regard to a length of the component model dataset, and wherein the commissioning data are created when the commissioning digital double dataset is created taking into consideration previously collected, customer-specific configuration data from the generic component model datasets, by calculating and supplementing data relating to the undetermined dimension, taking the customer-specific configuration data into consideration.

6. The method according to claim 1, wherein the passenger transport system is an elevator, and wherein the component model datasets of the passenger transport system comprise component model datasets of a support structure comprising several component model datasets selected from a group comprising guide rail component model datasets, wall mounting component model datasets, drive frame component model datasets, floor mounting component model datasets, cross strut component model datasets, longitudinal strut component model datasets and diagonal strut component model datasets.

7. The method according to claim 6, wherein the generic component model datasets of the support structure with regard to a length, of the component model dataset are undetermined and wherein, when the commissioning digital double dataset is created, the commissioning data are created taking into consideration previously collected, customer-specific configuration data from the generic component model datasets by calculating and supplementing data relating to the undetermined dimension, taking the customer-specific configuration data into consideration.

8. A method for manufacturing a passenger transport system, comprising:
   commissioning the passenger transport system using the method of claim 1; and
   manufacturing the passenger transport system with characterizing properties as specified in the commissioning digital double dataset.

9. The method of claim 8, further comprising creating a completion digital double dataset based on the commissioning digital double dataset by measuring actual data, which depicts characterizing properties of components of the passenger transportation system in an actual configuration of the passenger transport system immediately after assembly and installation thereof in a building and a replacement of target data in the commissioning digital double dataset by corresponding actual data.

10. A device for commissioning a passenger transport system, wherein:
   the device is configured to create a commissioning digital double dataset of the passenger transport system with target data, which depicts characterizing properties of components of the passenger transport system in a target configuration, wherein, firstly, commissioning data are created taking into consideration previously collected, customer-specific configuration data from generic component model datasets and defined component model datasets, and then manufacturing data, based on which the passenger transport system is to be manufactured, are created by supplementing the commissioning data with production-specific data, wherein a defined component model dataset depicts a configuration of an individual component with respect to all the characterizing properties that are essential for its manufacture, and
   a generic component model dataset allows a configuration of several different components and depicts several characterizing properties that are essential for its manufacture in such a way that a generic component model dataset can be supplemented by taking into consideration the previously collected customer-specific configuration data by data in such a way that it is converted into a single, defined component model dataset, which depicts all the characterizing properties that are essential for the manufacture of the passenger transport system.

11. A non-transitory computer readable medium comprising instructions that, when executed, configure a processor to:
   create a commissioning digital double dataset for a passenger transport system with target data which depicts characterizing properties of components of the passenger transport system in a target configuration,
   wherein the creation of the commissioning digital double dataset comprises:
      firstly, creating commissioning data from generic component model datasets and defined component model datasets by taking into consideration previously collected customer-specific configuration data, and
      subsequently, creating manufacturing data that specify the target configuration by supplementing the commissioning data with production-specific data,
   wherein a defined component model dataset depicts a configuration of an individual component with respect to all the characterizing properties that are related to its manufacture, and
   wherein a generic component model dataset permits a configuration of several different components and depicts several characterizing properties that are related to its manufacture so that a generic component model dataset can be supplemented by taking into consideration the previously collected customer-specific configuration data in such a way that this is converted into a single, defined component model dataset which depicts characterizing properties for manufacturing the passenger transport system.

* * * * *